United States Patent
Liao

(10) Patent No.: US 9,552,098 B2
(45) Date of Patent: Jan. 24, 2017

(54) MOBILE DEVICE AND PROXIMITY DETECTION METHOD

(71) Applicant: HTC Corporation, Taoyuan (TW)

(72) Inventor: Chi-Yi Liao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/639,136

(22) Filed: Mar. 5, 2015

(65) Prior Publication Data

US 2016/0259462 A1 Sep. 8, 2016

(51) Int. Cl.
*H04M 1/00* (2006.01)
*G06F 3/041* (2006.01)
*H04B 1/3888* (2015.01)
*G01V 8/12* (2006.01)
*G01J 1/42* (2006.01)

(52) U.S. Cl.
CPC ........... *G06F 3/0416* (2013.01); *G01J 1/4204* (2013.01); *G01V 8/12* (2013.01); *H04B 1/3888* (2013.01)

(58) Field of Classification Search
CPC ............ H04M 2250/22; H04M 1/0245; H04M 1/0214
USPC ............... 455/575.1, 575.3, 574, 572, 575.8, 90.3,455/90.2, 41.1–41.3, 566, 556.1, 556.2, 557, 73,455/422.1, 403, 500, 517; 379/433.01, 433.11, 379/437
See application file for complete search history.

(56) References Cited

U.S. PATENT DOCUMENTS

| | | | |
|---|---|---|---|
| 2013/0215007 A1* | 8/2013 | Hung | G06F 1/1677 345/156 |
| 2013/0229442 A1* | 9/2013 | Yang | G06F 1/1684 345/690 |
| 2014/0183342 A1* | 7/2014 | Shedletsky | G06F 1/1637 250/215 |
| 2014/0268517 A1 | 9/2014 | Moon et al. | |
| 2014/0318994 A1* | 10/2014 | Lee | A45C 11/00 206/37 |

FOREIGN PATENT DOCUMENTS

| | | |
|---|---|---|
| TW | 201026002 | 7/2010 |
| TW | 201335744 | 9/2013 |
| TW | 201339952 | 10/2013 |
| TW | 201445400 | 12/2014 |

OTHER PUBLICATIONS

"Office Action of Taiwan Counterpart Application", issued on Jul. 27, 2016, p. 1-p. 7.

* cited by examiner

*Primary Examiner* — Keith Ferguson
(74) *Attorney, Agent, or Firm* — Jianq Chyun IP Office

(57) ABSTRACT

A mobile device and a corresponding proximity detection method are provided. The mobile device includes an infrared emitter and a proximity sensor. The infrared emitter emits an infrared using first power in a first mode or emits the infrared using second power in a second mode. The first power and the second power are different. The proximity sensor detects the reflection of the infrared and determines whether or not there is an object in close proximity to the mobile device based on the reflection.

11 Claims, 3 Drawing Sheets

MOBILE DEVICE AND PROXIMITY DETECTION METHOD

BACKGROUND OF THE INVENTION

Field of the Invention

The invention relates to a mobile device, and more particularly, to a proximity detection method of said mobile device.

Description of Related Art

At present, a flip cover is usually available for purchase as an optional accessory to a smart phone. The smart phone usually contains a Hall sensor and the corresponding flip cover usually contains a magnet. When the flip cover is closed up, the Hall sensor may sense a magnetic field from the magnet so that the smart phone may automatically enter a suspend mode. When the flip cover is opened up, since the Hall sensor can no longer sense the magnetic field, the smart phone may automatically exit the suspend mode.

However, users may not consider purchasing the flip cover for it is the optional accessory. In that case, the Hall sensor contained in the smart phone may become a waste.

SUMMARY OF THE INVENTION

The invention is directed to a mobile device and a proximity detection method, which are used to solve aforesaid problem regarding the waste.

The mobile device of the invention includes an infrared emitter and a proximity sensor. The infrared emitter emits an infrared ray by using first power in a first mode or emits the infrared ray by using second power in a second mode. The first power and the second power are different. The proximity sensor detects a reflected light of the infrared ray and determines whether an object is in close proximity to the mobile device based on the reflected light.

The proximity detection method of the invention is adapted to a mobile device, and includes the steps of: emitting an infrared ray by using first power in a first mode; emitting the infrared ray by using second power in a second mode, wherein the first power and the second power are different; detecting a reflected light of the infrared ray; and determining whether an object is in close proximity to the mobile device based on the reflected light.

The mobile device and the proximity detection method as provided above are capable of replacing the Hall sensor and the magnet in conventional art by using the infrared emitter and the proximity sensor. Other than detecting whether the mobile device is covered, the infrared emitter and the proximity sensor are also capable of executing other functions. Accordingly, even if the mobile device is not installed with the flip cover, the waste caused by the infrared emitter and the proximity sensor being useless may then be avoided.

To make the above features and advantages of the invention more comprehensible, several embodiments accompanied with drawings are described in detail as follows.

DESCRIPTION OF THE EMBODIMENTS

Figure 1:
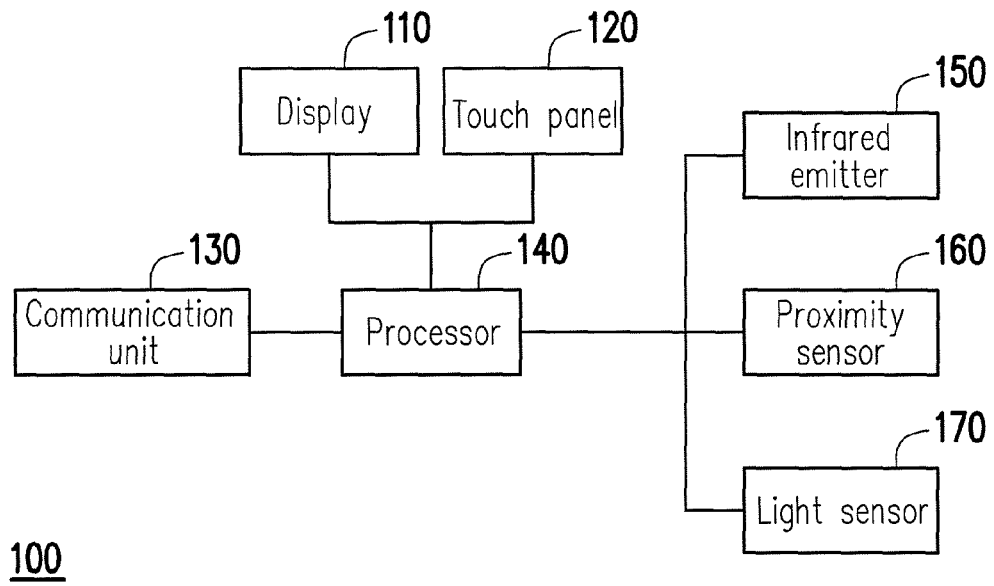
FIG. 1 and FIG. 2 are schematic diagrams illustrating a mobile device according to an embodiment of the invention.

FIG. 1 is a schematic diagram of a mobile device 100 according to an embodiment of the invention. The mobile device 100 may be a smart phone, a personal digital assistant (PDA) or a tablet computer. The mobile device 100 at least includes a display 110, a touch panel 120, a communication unit 130, a processor 140, an infrared emitter 150, a proximity sensor 160 and a light sensor 170. The processor 140 is coupled to the display 110, the touch panel 120, the communication unit 130, the infrared emitter 150, the proximity sensor 160 and the light sensor 170.

The communication unit 130 may conduct a telephone communication by using one or more communication protocols. The display 110 is configured to display a user interface of the mobile device 100. The touch panel 120 is configured to detect a touch operation and inputs on the mobile device 100. A touch display may be composed of the display 110 and the touch panel 120.

The infrared emitter 150 may be an infrared light-emitting diode (LED) or other electronic components capable of emitting infrared ray. The infrared emitter 150 includes two modes. In a first mode, the infrared emitter 150 may emit an infrared ray by using first power. In a second mode, the infrared emitter 150 may emit the infrared ray by using second power. The first power and the second power are different. In the present embodiment, the first power is lower than the second power. Therefore, the first mode may be referred to as a low-power mode, and the second mode may be referred to as a high-power mode.

The proximity sensor 160 is configured to detect a reflected light of the infrared ray emitted by the infrared emitter 150 and determine whether an object is in close proximity to the mobile device 100 based on the reflected light. The proximity sensor 160 may convert an intensity of the reflected light into a sensor value, and then compare this sensor value with a predetermined threshold so as to determine whether the object is in close proximity to the mobile device 100.

The light sensor 170 is configured to detect an ambient brightness and determine whether the mobile device 100 is in a dark environment based on the ambient brightness. The proximity sensor 170 may convert the ambient brightness into the sensor value, and then compare the sensor value with another predetermined threshold so as to determine whether the mobile device 100 is in the dark environment. The light sensor 170 may also use the same method to determine whether the mobile device 100 has left the dark environment.

Figure 2:
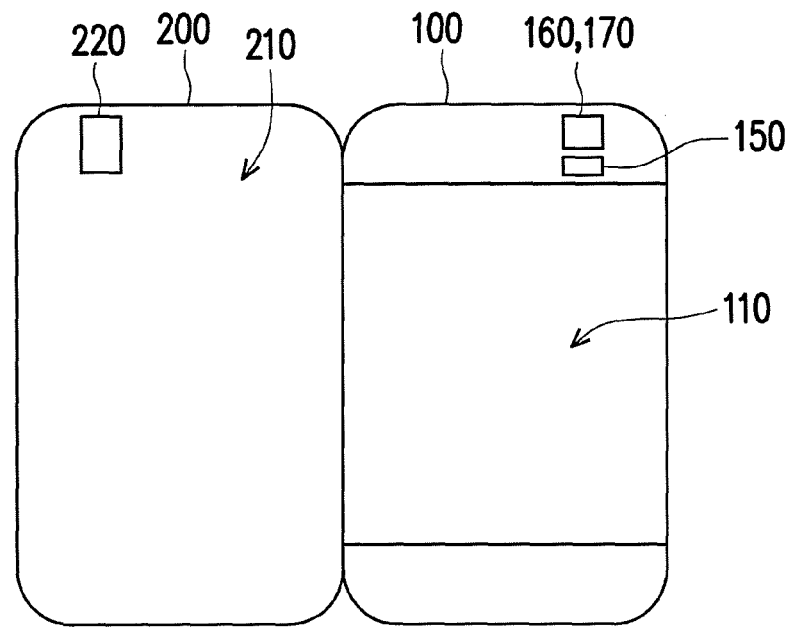

FIG. 2 is also a schematic diagram of the mobile device 100 according to the present embodiment. The mobile device 100 of FIG. 2 further includes an upper cover 200, which is configured to cover a main body of the mobile device 100, and on which the proximity sensor 160 and the light sensor 170 may be combined into one module disposed on the same location. In the present embodiment, the upper cover 200 is a flip cover. In another embodiment of the invention, the upper cover 200 may be a slide cover or a cover of other types.

The upper cover 200 may be opened or closed in relative to the mobile device 100. A surface 210 of the upper cover 200 in relative to the infrared emitter 150 and the proximity sensor 160 includes a reflection area 220. When the upper cover 200 is closed in relative to the mobile device 100, the upper cover 200 covers the light sensor 170, and the reflection area 220 covers the infrared emitter 150 and the proximity sensor 160. The reflection area 220 may include a material with high reflection coefficient, such as a metallic spray paint including a metallic material. Accordingly, the reflection coefficient of the reflection area 220 may be quite similar to that of a mirror surface, so as to fully reflect the infrared ray emitted by the infrared emitter 150.

The first mode of the infrared emitter 150 may be used to detect whether the upper cover 200 is closed in relative to the mobile device 100. In the first mode, the infrared emitter 150 emits the infrared ray by using the first power. When the upper cover 200 is closed in relative to the mobile device 100, the infrared ray is reflected by the reflection area 220 and then detected by the proximity sensor 160. With the reflection coefficient of the reflection area 220 being extremely high, even though the infrared emitter 150 emits the infrared ray by using the first power that is relatively less, the sensor value of the proximity sensor 160 can still be greater than the predetermined threshold to thereby determine that the object is in close proximity to the mobile device 100. On the other hand, with the reflection coefficient of a common object being relatively low, when the common object covers above the infrared emitter 150 and the proximity sensor 160, the sensor value of the proximity sensor 160 is less than the predetermined value, and thus it is determined that no object is in close proximity to the mobile device 100. As a result, the mobile device 100 may distinguish the upper cover 200 from other objects to avoid incorrect operation caused by misjudgment.

The second mode of the infrared emitter 150 may be used to detect whether a user is close to the mobile device 100. In the second mode, the infrared emitter 150 emits the infrared ray by using the second power. When the user is close to the mobile device 100, the infrared ray is reflected by the user and then detected by the proximity sensor 160. Because skin of the user has the reflection coefficient being lower than that of the reflection area 220, the infrared emitter 150 needs to emit the infrared ray by using the second power that is relatively high, so that the sensor value of the proximity sensor 160 can be greater than the predetermined threshold to thereby determine that the object is in close proximity to the mobile device 100.

Figure 3:
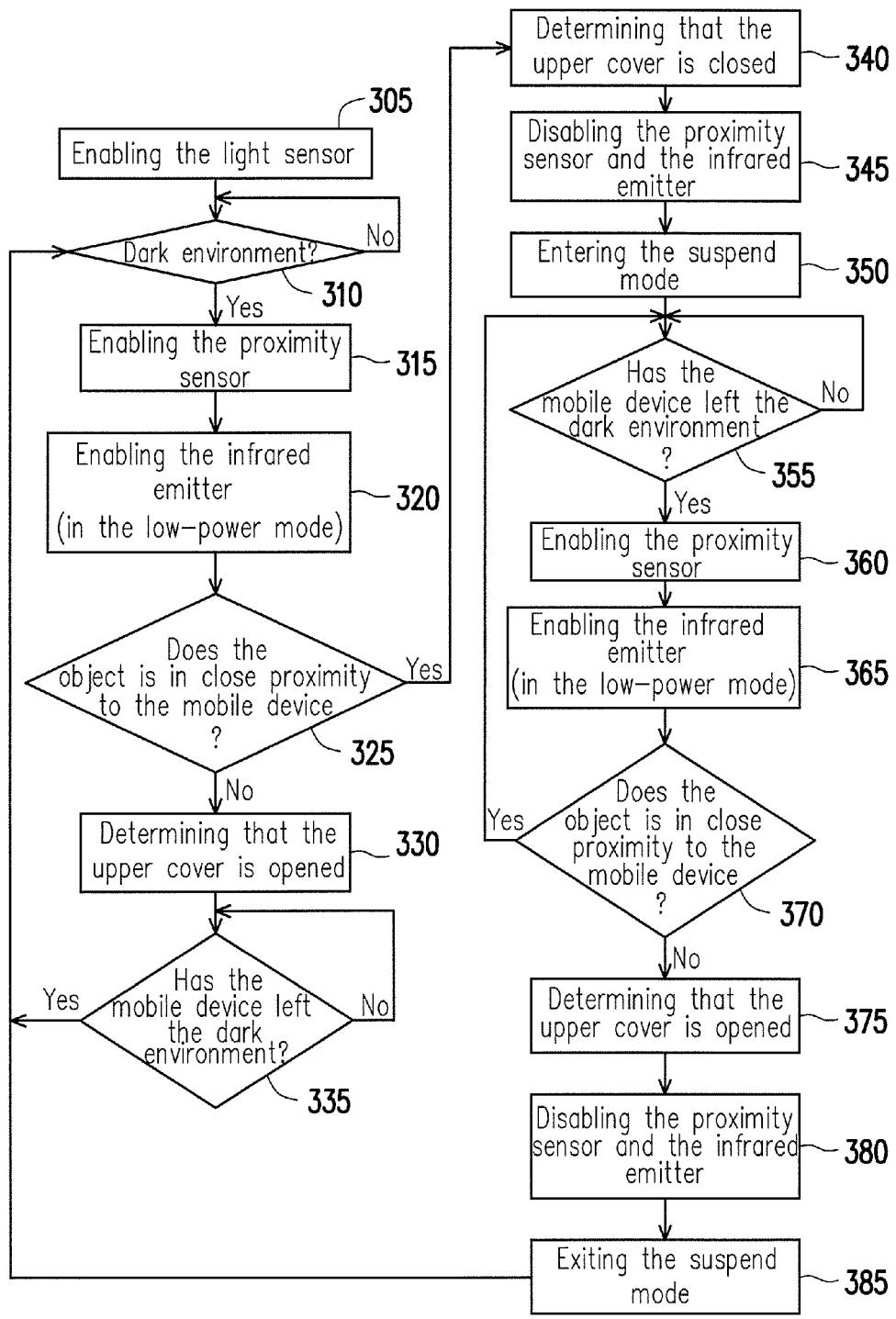
FIG. 3 is a flowchart of a proximity detection method according to an embodiment of the invention.

FIG. 3 is a flowchart of a proximity detection method according to an embodiment of the invention, and such method may be executed by the mobile device 100. In step 305, the processor 140 enables the light sensor 170. In step 310, the light sensor 170 determines whether the mobile device 100 is in the dark environment. If no, the flow returns to step 310. If yes, the light sensor 170 emits an interrupt signal or a signal in other form to inform the processor 140. Then, the processor 140 enables the proximity sensor 160 in step 315. The processor 140 enables the infrared emitter 150 in step 320, and controls the infrared emitter 150 to enter the first mode with low-power.

In step 325, the proximity sensor 160 determines whether the object is in close proximity to the mobile device 100. If no object is in close proximity to the mobile device 100, the proximity sensor 160 emits the interrupt signal or the signal in other form to inform the processor 140. Then, the processor 140 determines that the upper cover 200 is opened in relative to the mobile device 100 in step 330. In step 335, the light sensor 170 determines whether the mobile device 100 has left the dark environment. If no, the flow returns to step 335. If yes, the flow returns to step 310.

In step 325, if a determination result of the proximity sensor 160 is that the object is in close proximity to the mobile device 100, the proximity sensor 160 informs the processor 140. Then, the processor 140 determines that the upper cover 200 is closed in relative to the mobile device 100 in step 340. The processor 140 disables the proximity sensor 160 and the infrared emitter 150 in step 345. Then, the processor 140 controls the mobile device 100 to enter the suspend mode in step 350.

Subsequently, the light sensor 170 determines whether the mobile device 100 has left the dark environment in step 355. If no, the flow returns to step 355. If yes, the light sensor 170 informs the processor 140. Then, the processor 140 enables the proximity sensor 160 in step 360. The processor 140 enables the infrared emitter 150 in step 365, and controls the infrared emitter 150 to enter the first mode. In step 370, the proximity sensor 160 determines whether the object is in close proximity to the mobile device 100. If the object is in close proximity to the mobile device 100, it indicates that the upper cover 200 is still closed in relative to the mobile device 100, and the flow returns to step 355. If no object is in close proximity to the mobile device 100, the proximity sensor 160 informs the processor 140. Then, the processor 140 determines that the upper cover 200 is opened in relative to the mobile device 100 in step 375. The processor 140 disables the proximity sensor 160 and the infrared emitter 150 in step 380. The processor 140 controls the mobile device 100 to exit the suspend mode in step 385. Then, the flow returns to step 310.

Figure 4:
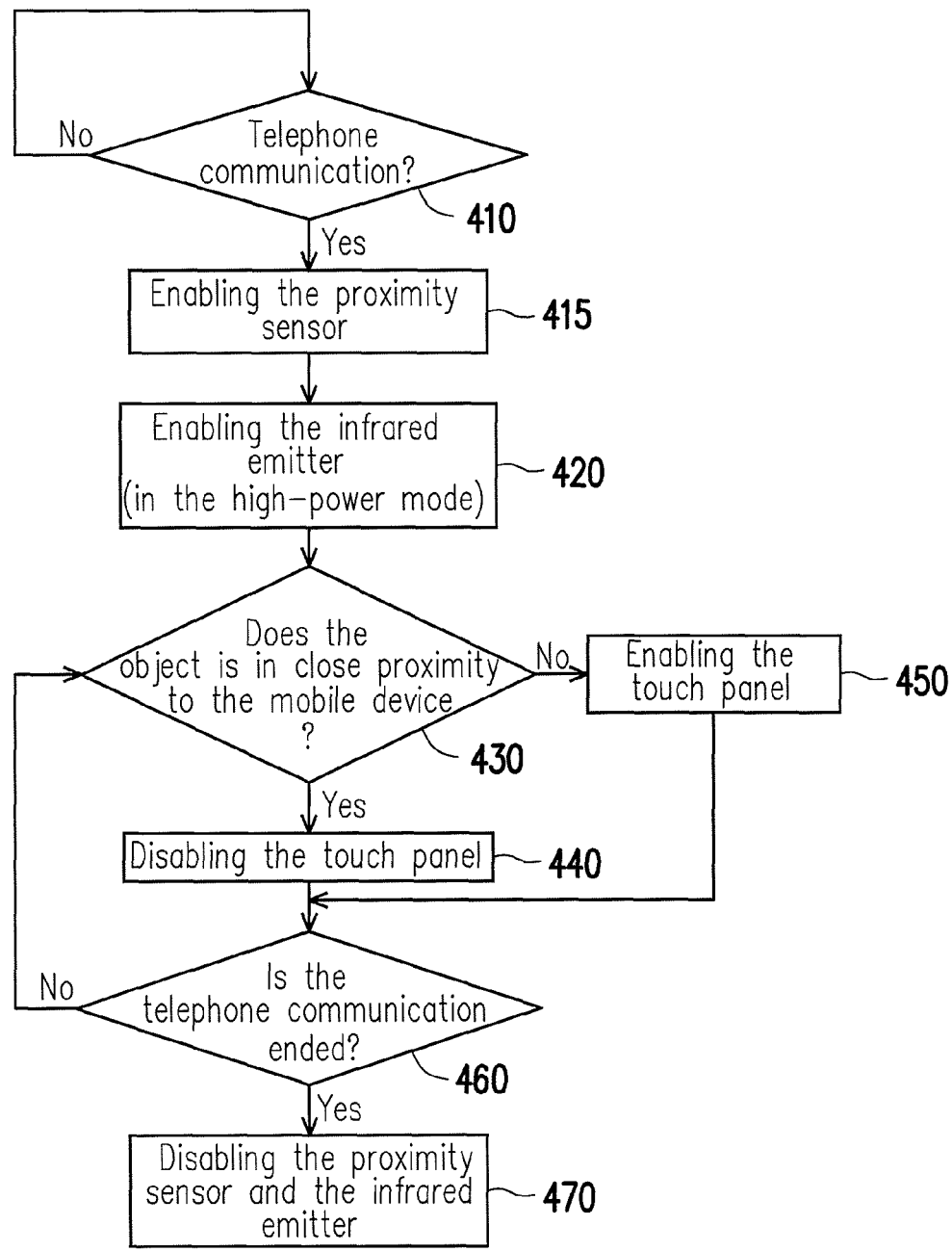
FIG. 4 is a flowchart of a proximity detection method according to another embodiment of the invention.

FIG. 4 is a flowchart of a proximity detection method according to another embodiment of the invention, and such method may be executed by the mobile device 100. In step 410, the processor 140 determines whether the communication unit 130 conducts the telephone communication. If no, the flow returns to step 410. If yes, the processor 140 enables the proximity sensor 160 in step 415, and then enables the infrared emitter 150 and controls the infrared emitter 150 to enter the second mode with high-power in step 420.

In step 430, the proximity sensor 160 determines whether the object is in close proximity to the mobile device 100, and then emits the interrupt signal or the signal in other form to inform the processor 140 of the determination result. If the proximity sensor 160 determines that the object is in close proximity to the mobile device 100, it indicates that the user is very close to the mobile device 100, and the processor 140 may disable the touch panel 120 in step 440 to avoid incorrect operation caused by the user who mistakenly touched the touch panel during the telephone communication. If the proximity sensor 160 determines that no object is in close proximity to the mobile device 100, the processor 140 enables the touch panel 120 in step 450.

Subsequently, the processor 140 determines whether the telephone communication conducted by the communication unit 130 is ended in step 460. If the telephone communication is not ended, the flow returns to step 430. If the telephone communication is ended, the processor 140 disables the proximity sensor 160 and the infrared emitter 150 in step 470.

The mobile device and the proximity detection method as provided above are capable of detecting whether the mobile device is covered by using the infrared emitter and the proximity sensor instead of the Hall sensor and the magnet in conventional art. As a result, cost and space for implementing the Hall sensor and the magnet may be saved. Other than detecting whether the mobile device is covered, the infrared emitter and the proximity sensor are also capable of detecting whether the user is close to the mobile device. Accordingly, even if the mobile device is not installed with the flip cover, the waste caused by the infrared emitter and the proximity sensor being useless may then be avoided.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A mobile device, comprising:
an infrared emitter, configured to emit an infrared ray by using first power in a first mode or emit the infrared ray by using second power in a second mode, wherein the first power and the second power are different;
a proximity sensor, configured to detect a reflected light of the infrared ray and determine whether an object is in close proximity to the mobile device based on the reflected light;
a light sensor, configured to detect an ambient brightness and determine whether the mobile device is in a dark environment based on the ambient brightness; and
a processor, coupled to the infrared emitter, the proximity sensor and the light sensor, wherein when the light sensor determines that the mobile device is in the dark environment and the proximity sensor determines that the object is in close proximity to the mobile device, the processor controls the mobile device to enter a suspend mode,
wherein the processor enables the infrared emitter and the proximity sensor and controls the infrared emitter to enter the first mode after the light sensor determines that the mobile device is in the dark environment, wherein before the mobile device enters the suspend mode, the processor disables the infrared emitter and the proximity sensor without disabling the light sensor.

2. The mobile device according to claim 1, further comprising:
an upper cover, wherein the upper cover is capable of being opened or closed in relative to the mobile device, and a surface of the upper cover in relative to the infrared emitter and the proximity sensor comprises a reflection area, wherein when the upper cover is closed in relative to the mobile device, the reflection area covers the infrared emitter and the proximity sensor.

3. The mobile device according to claim 2, wherein the first power is lower than the second power, the reflected light in the first mode comes from the reflection area, and the reflection area comprises a metallic material.

4. The mobile device according to claim 2,
wherein when the upper cover is closed in relative to the mobile device, the upper cover covers the light sensor.

5. The mobile device according to claim 1, wherein when the light sensor determines that the mobile device has left the dark environment and the proximity sensor determines that no object is in close proximity to the mobile device, the processor controls the mobile device to exit the suspend mode.

6. The mobile device according to claim 5, wherein the processor enables the infrared emitter and the proximity sensor and controls the infrared emitter to enter the first mode after the light sensor determines that the mobile device has left the dark environment, wherein when the mobile device is in the suspend mode, the processor disables the infrared emitter and the proximity sensor.

7. The mobile device according to claim 1, further comprising:
a communication unit, configured to conduct a telephone communication; and
a touch panel, configured to detect a touch operation on the mobile device, wherein
the processor is coupled to the communication unit and the touch panel, and configured to enable the infrared emitter and control the infrared emitter to enter the second mode when the communication unit conducts the telephone communication, disable the touch panel when the proximity sensor determines that the object is in close proximity to the mobile device, and enable the touch panel when the proximity sensor determines that no object is in close proximity to the mobile device.

8. A proximity detection method for a mobile device comprising an infrared emitter, a proximity sensor, a light sensor and a processor, the method comprising
emitting, by the infrared emitter, an infrared ray by using first power in a first mode;
emitting, by the infrared emitter, the infrared ray by using second power in a second mode, wherein the first power and the second power are different;
detecting, by the proximity sensor, a reflected light of the infrared ray;
determining, by the proximity sensor, whether an object is in close proximity to the mobile device based on the reflected light;
detecting, by the light sensor, an ambient brightness;
determine, by the light sensor, whether the mobile device is in a dark environment based on the ambient brightness; and
in the first mode, when the mobile device is in the dark environment and the object is in close proximity to the mobile device, controlling the mobile device to enter a suspend mode by the processor,
enabling, by the processor, the infrared emitter and the proximity sensor and controlling, by the processor, the infrared emitter to enter the first mode after the light sensor determines that the mobile device is in the dark environment, wherein before the mobile device enters the suspend mode, disabling, by the processor, the infrared emitter and the proximity sensor without disabling the light sensor.

9. The proximity detection method according to claim 8, wherein the first power is lower than the second power, the reflected light in the first mode comes from a reflection area of an upper cover of the mobile device, and the reflection area comprises a metallic material.

10. The proximity detection method according to claim 8, further comprising:
when the mobile device has entered the suspend mode, if the mobile device has left the dark environment and no object is in close proximity to the mobile device, controlling the mobile device to exit the suspend mode by the processor.

11. The proximity detection method according to claim 8, further comprising:
entering the second mode when the mobile device conducts a telephone communication;
in the second mode, disabling a touch panel of the mobile device when the object is in close proximity to the mobile device; and
in the second mode, enabling the touch panel of the mobile device when no object is in close proximity to the mobile device.

* * * * *